(12) United States Patent
Saele

(10) Patent No.: US 7,210,468 B1
(45) Date of Patent: May 1, 2007

(54) HEAT EXCHANGER METHOD AND APPARATUS

(75) Inventor: Gregory J. Saele, Itasca, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/256,916

(22) Filed: Oct. 24, 2005

(51) Int. Cl.
*F02M 25/07* (2006.01)
*F02B 47/08* (2006.01)
*F02B 33/44* (2006.01)
*F01N 3/00* (2006.01)

(52) U.S. Cl. .................. 123/568.12; 60/320; 60/605.2

(58) Field of Classification Search .................. 60/278, 60/279, 320, 321, 605.2; 123/568.11, 568.12; 165/61, 66, 85, 103, 157, 162, 164, 165, 165/168, 177
See application file for complete search history.

(56) References Cited

U.S. PATENT DOCUMENTS

| 4,852,642 A * | 8/1989 | Lee ............................. 165/85 |
| 5,203,311 A | 4/1993 | Hitomi et al. |
| 5,607,010 A | 3/1997 | Schönfeld et al. |
| 5,771,868 A | 6/1998 | Khair |
| 5,802,846 A | 9/1998 | Bailey |
| 6,009,709 A | 1/2000 | Bailey |
| 6,367,256 B1 | 4/2002 | McKee |
| 6,647,970 B2 | 11/2003 | Hankins |
| 6,880,535 B2 * | 4/2005 | Sorter et al. ............ 123/568.18 |
| 6,976,481 B2 * | 12/2005 | Kobayashi et al. ..... 123/568.12 |
| 2002/0040708 A1 * | 4/2002 | Chmela et al. ......... 123/568.12 |
| 2002/0195090 A1 | 12/2002 | Marsh et al. |
| 2004/0231328 A1 * | 11/2004 | Reider et al. ............... 60/605.2 |
| 2006/0075995 A1 * | 4/2006 | Liu et al. ................ 123/568.12 |
| 2006/0124114 A1 * | 6/2006 | Sayers et al. ........... 123/568.12 |
| 2006/0174611 A1 * | 8/2006 | Dilley et al. ................... 60/320 |

FOREIGN PATENT DOCUMENTS

JP          2006078062 A  *  3/2006  .................. 165/177

* cited by examiner

*Primary Examiner*—Willis R. Wolfe, Jr.
(74) *Attorney, Agent, or Firm*—Elias P. Soupos; Susan L. Lukasik; Jeffrey P. Calfa

(57) ABSTRACT

A method for an internal combustion engine includes the steps of collecting exhaust gas in a volume (502) and flowing exhaust gas out of the volume in a first and a second portions (504). The first portion forms a tailpipe gas stream (506), and the second portion forms an EGR gas stream (508). The tailpipe gas stream goes through a turbine (510), and is heated in a heat exchanger (512). The heat exchanger transfers thermal energy out of the EGR gas stream (516) to heat the tailpipe gas stream. The EGR gas stream is recirculated into an intake of the internal combustion engine (518).

13 Claims, 4 Drawing Sheets

- PRIOR ART -

SECTION A-A

HEAT EXCHANGER METHOD AND APPARATUS

FIELD OF THE INVENTION

This invention relates to internal combustion engines, including but not limited to engines having exhaust gas heat exchangers.

BACKGROUND OF THE INVENTION

Internal combustion engines generate heat during operation that is released into the environment through exhaust gas emissions. Modern emission controls systems may utilize energy, in the form of heat from the exhaust gas, to operate various components, for example, Diesel Particulate Filters (DPF). In other cases, heat may be undesirable and removed by use of other components and systems.

One example of a case where additional heat is desirable for the operation of an engine is the operation of a DPF, which depends on a reaction that occurs internally to the DPF and burns particulates that have accumulated therein. Some engines incorporate thermal shielding on their exhaust systems to contain exhaust heat and make it available for emissions components. Heat makes the regeneration of the DPF more efficient. One example of a case where removal of heat is required for proper operation of the engine is in an exhaust gas recirculation (EGR) system, which recirculates cooled exhaust gas into an intake of the engine. EGR systems typically use exhaust gas coolers to remove heat from an exhaust gas stream during recirculation.

Even though heat input may be desirable for some engine systems, heat removed from other systems that is typically rejected back to the engine is undesirable. Heat rejected and/or generated internally to the engine is removed from the engine by a cooling system. Typical cooling systems promote efficient operation of the engine and protect heat sensitive systems. Thermally conductive fluids, that include for instance oil or engine coolant, carry heat collected from within the engine and/or engine components to a radiator, which then expels the heat to the environment.

Accordingly, there is a need for heat management in an engine that reduces undesirable internal heat load to the engine.

SUMMARY OF THE INVENTION

A method for an internal combustion engine includes the step of collecting exhaust gas in a volume. Exhaust gas flows out of the volume in a first portion and a second portion. The first portion forms a tailpipe gas stream and the second portion forms an exhaust gas recirculation (EGR) gas stream. The tailpipe gas stream passes through a turbine. Thermal energy from the EGR gas stream is extracted with a heat exchanger and the EGR gas stream is cooled. The tailpipe gas stream is heated in the heat exchanger with the extracted thermal energy and the EGR gas stream is recirculated into an intake of the internal combustion engine.

An apparatus includes an engine having a plurality of cylinders in fluid communication with an intake manifold and an exhaust manifold. A turbine is in fluid communication with a tailpipe system and the exhaust manifold. An air-to-air heat exchanger has a hot gas inlet, a cold gas inlet, a warm gas outlet, and a cooled gas outlet. The hot gas inlet is in direct fluid communication with the exhaust manifold and the cooled gas outlet. The cold gas inlet is in direct fluid communication with the turbine and the warm gas outlet. At least one tailpipe component is in fluid communication with the hot gas outlet.

An air-to-air heat exchanger includes an inner tube and an outer tube placed around the inner tube. The inner tube and the outer tube are concentric. A plurality of tabs is connected between the inner tube and the outer tube. A first gas stream flows in a first direction in an inner volume of the inner tube. A second volume is formed between the inner tube and the outer tube, and a second gas stream flows in a second direction in the second volume. The first direction and the second direction are advantageously opposite.

DESCRIPTION OF A PREFERRED EMBODIMENT

Figure 1:
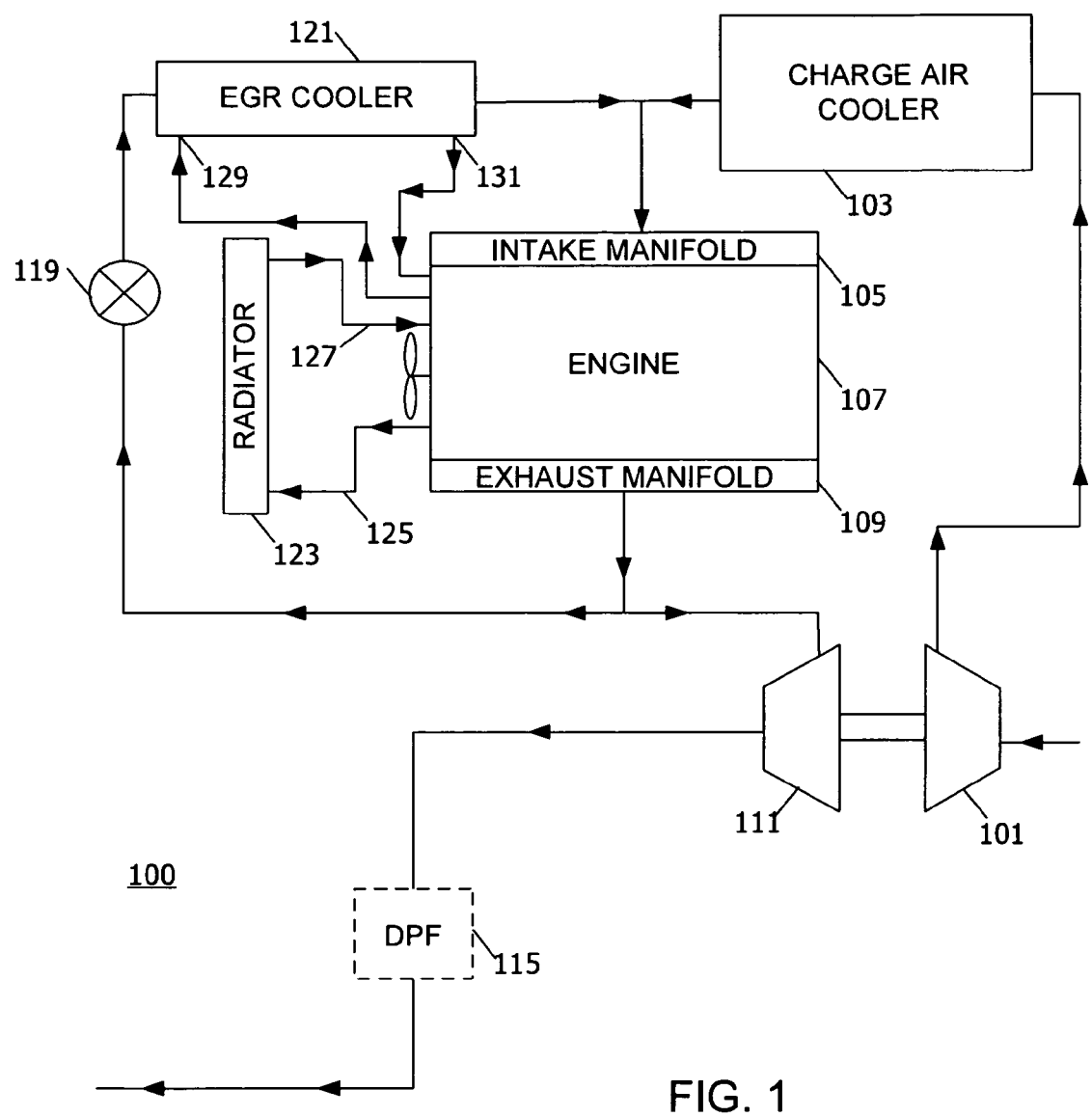
FIG. 1 is a block diagram of a typical engine.

The following describes an apparatus for and method of reducing undesirable heat load for a cooling system of an internal combustion engine. A typical turbocharged diesel engine system 100 having cooled EGR is shown in FIG. 1. Fresh air enters a compressor 101 of an engine 107. An outlet of the compressor 101 is connected to a charge air cooler 103. An outlet of the charge air cooler 103 is connected to an intake manifold 105 of an engine 107. Compressed air enters the intake manifold 105 of the engine 107 where it is mixed with fuel. The mixture of air and fuel is compressed in a combustion cylinder and combusts releasing work and heat. Heat released from the combustion of fuel and air is removed from the engine 107 in two ways. First, fluids such as oil and/or water-based coolants are circulated through the engine 107, in direct contact with engine components.

As engine components heat up, fluid circulating through the engine 107 is heated by conduction and/or convection. The heated fluid carries with it heat removed from the engine components. The heated fluid is taken to a radiator 123 through a radiator coolant supply passage 125. Heat is released to the environment by the radiator 123, and cooled fluid returns to the engine 107 through a radiator coolant return passage 127. In addition to the radiator 123, a second avenue for releasing heat from the engine is heat that is carried away from the engine 107 by exhaust gas exiting the engine 107 when combustion is complete, through an exhaust manifold 109.

A portion of the exhaust gas in the exhaust manifold 109 is recirculated into the intake manifold 105 of the engine 107 by passing through an EGR valve 119 and an EGR cooler 121. The EGR cooler 121 typically is an air-to-water cooler. Coolant from the engine 107 may enter the EGR cooler 121 through a coolant feed passage 129. Coolant from the coolant feed passage 129 passes through the cooler and collects heat from exhaust gas passing through the cooler that comes from the exhaust manifold 109. The exhaust gas is cooled and the coolant is heated. Heated coolant returns to the engine 107 through a coolant return passage 131. The coolant entering the engine 107 through the return passage 131 mixes with warm coolant coming from internal components of the engine 107, and is eventually routed to the radiator 123 where heat from the engine 107 and the EGR cooler 121 is expelled to the environment.

Another portion of the exhaust gas from the exhaust manifold 109 is routed to a turbine 111. The turbine 111 converts a portion of the heat and pressure of the exhaust gas into work to operate the compressor 101, and cooled exhaust gas at a lower pressure is expelled from the turbine 111 to the environment, or alternatively into after-treatment components, for example, a DPF 115.

The DPF 115 collects combustion byproducts from the exhaust gas and intermittently burns the byproducts through a process called regeneration. The efficiency of the regeneration process depends on the heat input to the DPF 115 from the exhaust gas. Increased thermal energy passing through the DPF 115 may lead to more efficient regeneration.

One disadvantage of the system shown in FIG. 1 is sub-optimal use of heat or thermal energy. Heat removed from the recirculated exhaust gas in the EGR cooler 121 is transferred to the engine cooling system and is subsequently released to the environment thus increasing a thermal load requirement for the cooling system. The system shown in FIG. 2 solves this and other problems.

An engine system 200 includes many common components as the engine system 100 shown in FIG. 1, with the exception of a heat exchanger 211. The common components are not described in detail for the sake of brevity. The heat exchanger 211 has a hot gas inlet 213, a warm gas outlet 215, a cold gas inlet 217, and a cooled gas outlet 219. The cold gas inlet 217 is fluidly connected to the warm gas outlet 215 to form a tailpipe gas stream 223, and the hot gas inlet 213 is fluidly connected to the cooled gas outlet 219 to form an EGR exhaust gas stream 221. Exhaust gas from the exhaust manifold 109 enters the heat exchanger 211 from the hot gas inlet 213, and exits through the cooled gas outlet 219. Exhaust gas from the exhaust manifold 109 also enters the turbine 111.

Exhaust gas exiting the turbine 111 enters the heat exchanger 211 from the cold gas inlet 217, and exits from the warm gas outlet 215 from where it is expelled to the environment. If after-treatment components are present, for example a DPF 250, or other components, the exhaust gas from the warm gas outlet 215 may pass through those components before being expelled to the environment. A temperature difference that exists between the EGR gas stream 221 and the tailpipe exhaust gas stream 223, before the two streams 221 and 223 enter the heat exchanger 211, causes heat to be transferred from the EGR gas stream 211 to the tailpipe gas stream 223 in the heat exchanger 211. The heat exchanger 211 effectively cools the EGR gas stream 221 and warms up the tailpipe gas stream 223.

Heat transfer occurring in the heat exchanger 211 is advantageous. A desired amount of heat removed from the EGR stream 221 may be determined by consideration of various factors, for example, the emissions requirements of the engine 107, or the use and capacity of an optional air to water EGR cooler 221. With a cooling effect applied to the EGR exhaust gas stream 221 in the heat exchanger 211, use of the air to water EGR cooler 225 and all design, manufacturing and development costs associated therewith may advantageously be avoided. A decision whether the optional air to water EGR cooler 225 is required may be determined by the ability to achieve a desired temperature of recirculated exhaust gas being recirculated. Regardless of use of the cooler 225, the ability to remove heat from the EGR stream 221, and to add heat to the tailpipe gas stream 223, can be advantageous.

First, the heat removed from the EGR gas stream 221 would have otherwise been expelled to the environment by being transferred to a cooling system and expelled through a radiator. With an implementation of the air-to-air heat exchanger 211 the heat removed from the EGR gas stream 221 is conserved and can be used for optimization of the operation of after-treatment components like the DPF 115. Second, there is a reduced heat transfer requirement on the EGR cooler 225, when used, because heat is removed from the EGR gas stream 221 upstream of the cooler 225. This reduced heat transfer requirement allows for use of a smaller and less costly EGR cooler 121. The reduced heat load on the EGR cooler 225 is also advantageous for the cooling system of the engine 107 because the size and cost of a vehicle's radiator may be reduced, and various attributes of the cooling system, such as a coolant pump (not shown) and passages, including the passages 125 and 127, may be downsized. Moreover, additional reductions of fan size and frequency of fan engagement may be implemented that may improve fuel economy by reducing parasitic losses.

Use of the EGR cooler 225 is optional. A coolant supply passage 227 and a coolant return passage 229 for the cooler 225 are also optional. If efficiency of the heat exchanger 211 is adequate to meet emissions requirements of the engine, there may be no need for a secondary cooler such as the air-to-water EGR cooler 225. Moreover, the heat exchanger 225 may be implemented in a different engine configuration that includes more than one turbine or compressor (not shown).

Figure 2:
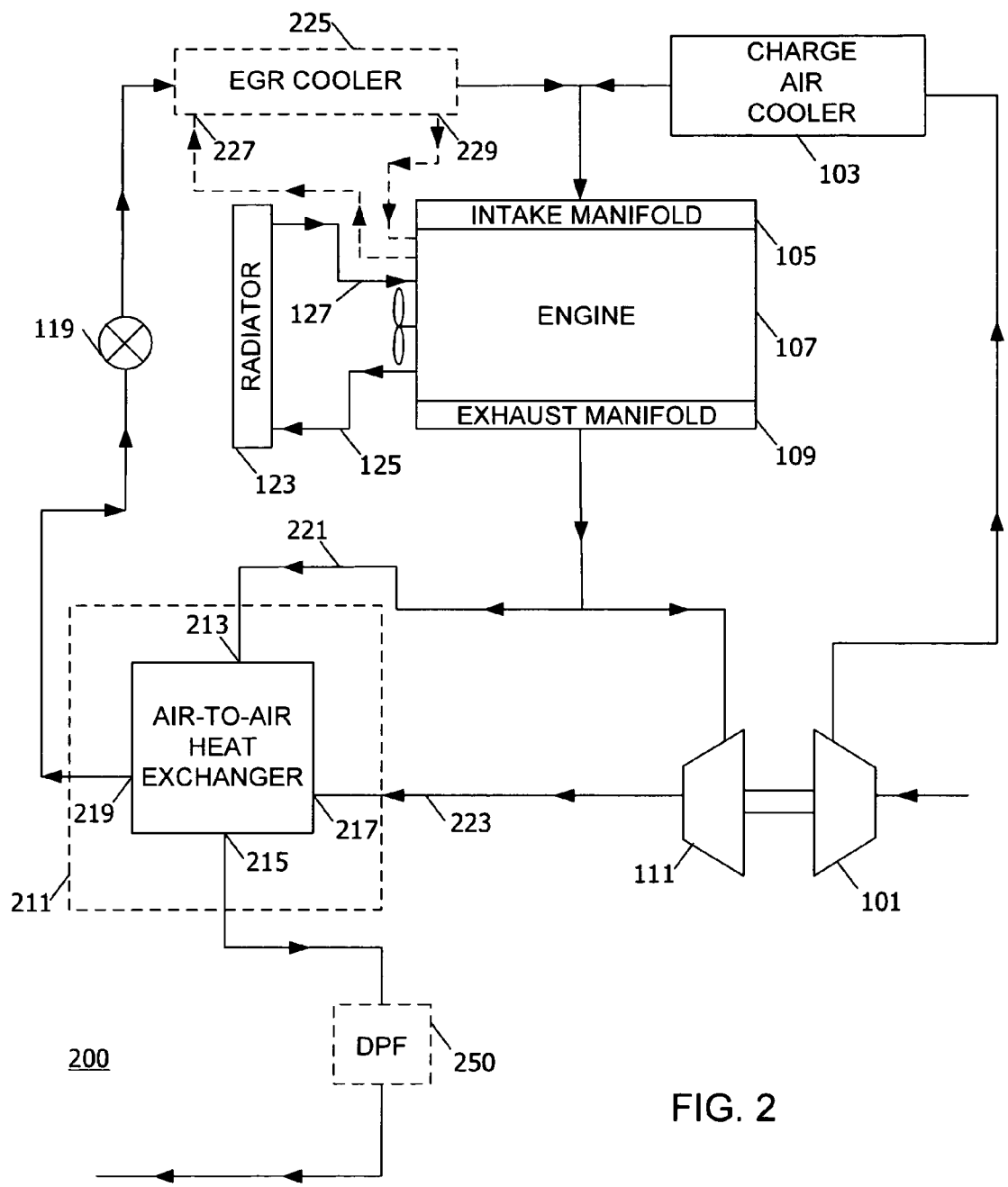
FIG. 2 is a block diagram of an engine having an air-to-air heat exchanger in accordance with the invention.
Figures 3, 4:
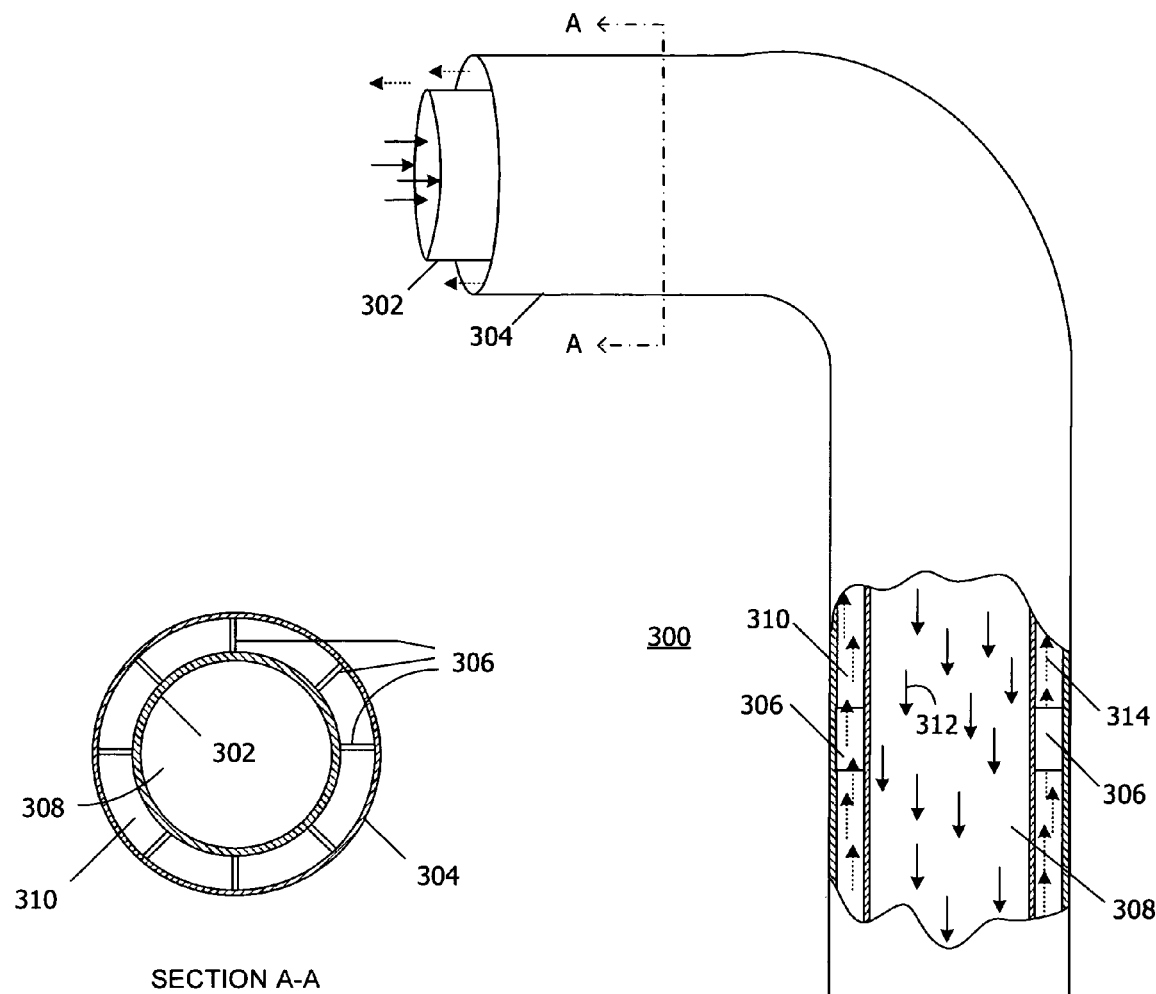
FIG. 3 is a perspective view of a section of an air-to-air heat exchanger that includes two concentric tubes in accordance with the invention.
FIG. 4 is a section view of the air-to-air heat exchanger of FIG. 3.

One possible implementation for an air-to-air heat exchanger 300 is shown in FIG. 3. The air-to-air heat exchanger 300 is configured to operate as a tube that is part of an exhaust system of an engine installed in a vehicle. The heat exchanger 300 may advantageously be positioned in a vehicle downstream of a turbine, as shown in the embodiment of FIG. 2, and form part of what is known in the art as a "down-pipe", denoting a tube connecting an outlet of a turbine with after-treatment and/or exhaust and/or a tailpipe of a vehicle.

The heat exchanger 300 includes an inner tube 302 contained in an outer tube 304. The tubes 302 and 304 may be concentric and may be thin walled steel tubes. The tubes may be connected with a plurality of tabs 306. One such tab 306 is shown in a partial cut-away section A—A, shown in FIG. 4. Each tab 306 may be cold-welded in position between the tubes 302 and 304, or may alternatively be fabricated between two plates that are formed into a tubular shape, but other methods for manufacture may be used. In the embodiment presented, a set of eight tabs 306 are used but another number of tabs 306 may be used to connect the tubes 302 and 304.

The inner tube forms an inner passage 308. The inner passage 308 is a volume enclosed within the inner tube 302 and is advantageously fluidly isolated from an outer passage 310 formed internally to the outer tube 304 and externally to the inner tube 302. In one embodiment, the heat exchanger 300 may be used as the air-to-air heat exchanger 211 shown in FIG. 2. The inner passage 308 may be used for routing of the tailpipe gas stream 223 traveling in a direction 312 denoted by the solid line arrows. The outer passage 310 may be used for routing of the EGR gas stream 221, advantageously insulating the tailpipe gas stream from the ambient environment to prevent heat loss. The EGR gas stream 221 travels in a direction 314 denoted by the dashed-line arrows, opposite of the direction 312 of travel for the after-treatment stream 223.

The directions 312 and 314 are advantageously opposite to promote more heat transfer between the two gas streams 221 and 223. Moreover, the tabs 306 that connect the tubes 302 and 304 also may be used as fins to promote the transfer of heat between the two streams 221 and 223, although additional fins may be added to the inner passage 308 and/or other fin configurations may be used in addition to or instead of the tabs 306. The tabs 306 are arranged along a plurality of radial directions with respect to a common center-point with the tubes 302 and 304. Fins, additional tubes, and other common heat exchanger design elements may be added to improve effectiveness of heat transfer.

Figure 5:
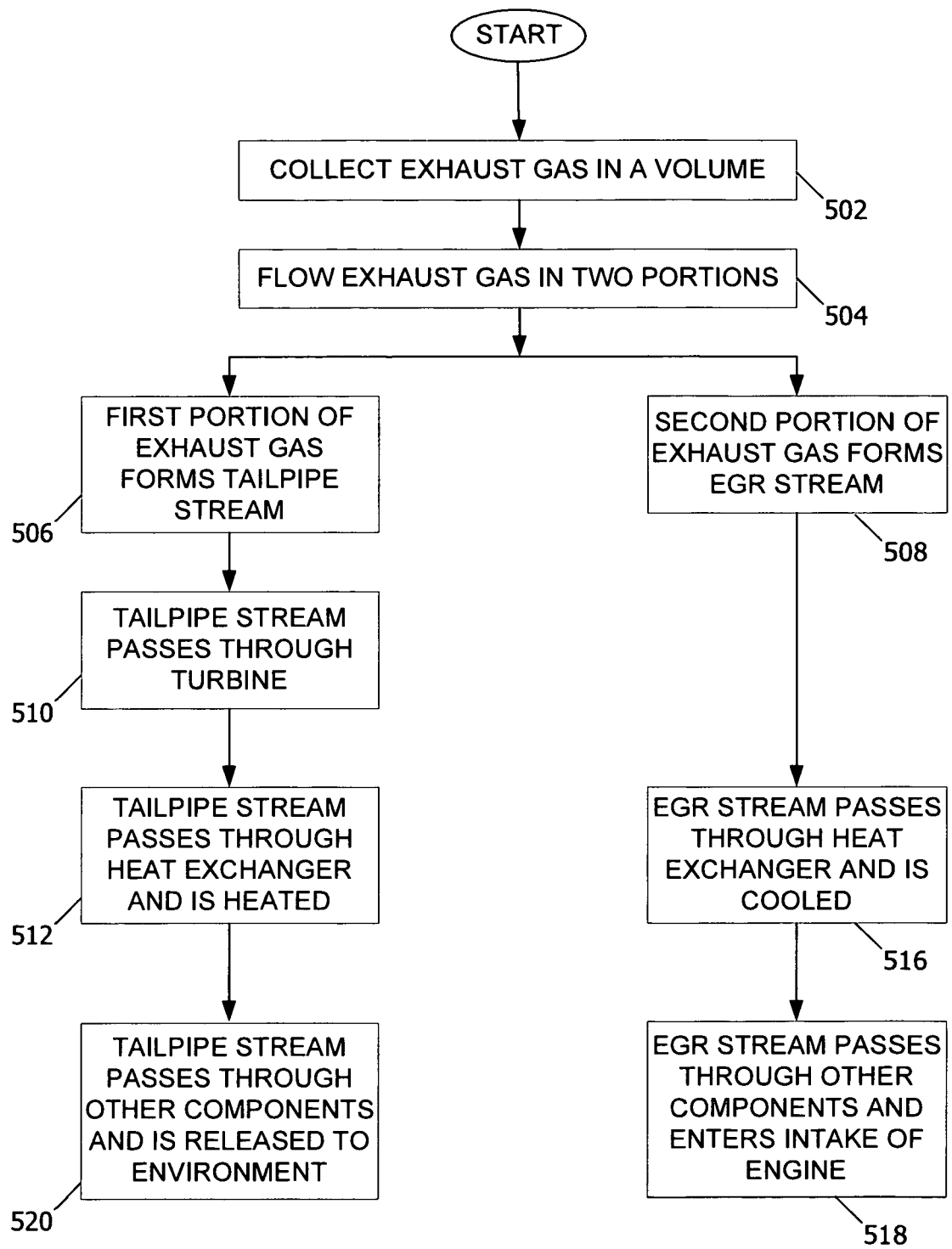
FIG. 5 is a flowchart for a method for effectively managing and recuperating heat in an internal combustion engine

A flowchart for a method for effectively managing and/or recuperating heat or thermal energy in an internal combustion engine is shown in FIG. 5. Exhaust gas is collected in a volume in step 502. Exhaust gas flows out of the volume in two portions in step 504. A first portion of exhaust gas from the volume flows out of the volume to form a tailpipe gas stream in step 506. A second portion of exhaust gas from the volume flows out of the volume to form an EGR gas stream in step 508. The tailpipe gas stream passes through at least one turbine in step 510. If additional turbines are present, the tailpipe gas stream may also pass through the additional turbines. An amount of heat is transferred from the EGR gas stream to the after-treatment stream in a heat exchanger. The tailpipe gas stream passes through the heat exchanger in step 512 where it is heated by receiving heat from the EGR gas stream.

The EGR gas stream passes through the heat exchanger in step 514 where it is cooled by giving up heat to the tailpipe gas stream and/or by convection to the environment. The EGR gas stream exits the heat exchanger and passes through other engine components, for example an EGR valve and/or an EGR cooler, before entering an intake manifold of an engine in step 518. The tailpipe gas stream exits the heat exchanger and passes through other engine and/or vehicle components, for example a DPF and/or an oxidation catalyst, before being released to the environment in step 520.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for an internal combustion engine comprising the steps of:
   collecting exhaust gas in a volume;
   flowing exhaust gas out of the volume in a first and a second portions, wherein the first portion forms a tailpipe gas stream, and wherein the second portion forms an exhaust gas recirculation (EGR) gas stream;
   passing the tailpipe gas stream through a turbine;
   transferring thermal energy from the EGR gas stream in a heat exchanger, wherein the EGR gas stream is cooled in the heat exchanger;
   heating the tailpipe gas stream in the heat exchanger with the extracted thermal energy; and
   recirculating the EGR gas stream into an intake of the internal combustion engine.

2. The method of claim 1, wherein volume is an exhaust manifold of the internal combustion engine, and wherein the EGR gas stream flows from the exhaust manifold upstream of the turbine.

3. The method of claim 1, wherein the tailpipe gas stream is exhaust gas flowing from an outlet of the turbine.

4. The method of claim 1, wherein the heat exchanger is an air-to-air heat exchanger.

5. The method of claim 1, further comprising the step of passing the tailpipe gas stream through at least one after-treatment component.

6. The method of claim 1, wherein the at least one after-treatment component is a diesel particulate filter.

7. An apparatus comprising:
   an engine having an intake manifold and an exhaust manifold;
   a turbine in fluid communication with the exhaust manifold;
   a heat exchanger having a hot gas inlet, a cold gas inlet, a warm gas outlet, and a cooled gas outlet
   wherein hot gas inlet is in direct fluid communication with the exhaust manifold and the cooled gas outlet, wherein the cold gas inlet is in direct fluid communication with the turbine and the warm gas outlet; and
   wherein the cooled gas outlet is in direct fluid communication with the intake manifold.

8. The apparatus of claim 7, further comprising an exhaust gas recirculation valve in fluid communication with the cooled gas outlet.

9. The apparatus of claim 7, further comprising an exhaust gas recirculation cooler in fluid communication with the EGR valve.

10. The apparatus of claim 7, further comprising an after-treatment component in fluid communication with the warm gas outlet, wherein the at least one after-treatment component is a diesel particulate filter.

11. The apparatus of claim 7, wherein the heat exchanger is an air-to-air heat exchanger.

12. The apparatus of claim 11, wherein the air-to-air heat exchanger includes an inner tube and an outer tube, wherein the inner tube and the outer tube are concentric, and wherein the air-to-air heat exchanger is disposed at an outlet of the turbine.

13. The apparatus of claim 12, wherein a tailpipe exhaust stream flows in the inner tube, and wherein an exhaust gas recirculation exhaust stream flows in a volume formed between the inner tube and outer tube.

* * * * *